United States Patent [19]
Bittinger et al.

[11] Patent Number: 5,923,326
[45] Date of Patent: Jul. 13, 1999

[54] EDGE DOCKING FOSTER WINDOW

[75] Inventors: Reed Bittinger, Raleigh; Keith Brafford, Chapel Hill; Kathy Khalifa, Apex; Mark Molander, Cary, all of N.C.

[73] Assignee: International Business Machines Corporation, Armonk, N.Y.

[21] Appl. No.: 08/876,037

[22] Filed: Jun. 13, 1997

[51] Int. Cl.[6] .................................................. G06F 15/00
[52] U.S. Cl. .......................................... 345/340; 345/346
[58] Field of Search ..................................... 345/340, 326, 345/339, 341, 342, 329, 330, 338, 343, 349, 345, 350–354

[56] References Cited

U.S. PATENT DOCUMENTS

| | | | |
|---|---|---|---|
| 5,487,141 | 1/1996 | Cain et al. | 345/340 |
| 5,613,122 | 3/1997 | Burnard et al. | 395/701 |
| 5,644,737 | 7/1997 | Tuniman et al. | 345/352 |
| 5,644,739 | 7/1997 | Moursund | 345/354 |
| 5,651,108 | 7/1997 | Cain et al. | 345/340 |
| 5,801,699 | 9/1998 | Hocker et al. | 345/348 |

OTHER PUBLICATIONS

IBM ARTour Web Express Server Guide, First Edition (Feb. 1997).
IBM ARTour WEB Express Server Guide, Second Edition (Jun. 1997).

*Primary Examiner*—Steven P. Sax
*Attorney, Agent, or Firm*—Myers Bigel Sibley & Sajovec, P.A.; Jeanine S. Ray-Yarletts

[57] ABSTRACT

Systems, methods, and computer program products provide a graphical user interface for a data processing system wherein a foster window associated with a secondary application program can be removably attached to a primary application window associated with a primary application program, such as a Web browser. The foster window can be automatically repositioned and/or resized in response to repositioning and/or resizing of the primary application window, such that the first and second windows maintain a generally rectangular attached configuration.

29 Claims, 7 Drawing Sheets

EDGE DOCKING FOSTER WINDOW

FIELD OF THE INVENTION

The present invention relates generally to user interfaces for computer systems. More particularly, the present invention relates to windows displayed within graphical user interfaces of computer systems.

BACKGROUND OF THE INVENTION

Graphical user interfaces are designed to make using a computer more intuitive. Exemplary graphical user interfaces are provided with operating systems such as IBM OS/2®, Apple® System 7®, and Microsoft® Windows 95®. These operating systems all rely on a "window like" workspace for displaying application programs, operating system information such as directory information, and program groupings. Multiple windows may be displayed on the screen of a computer display device simultaneously in what is often referred to as a "desktop." An exemplary desktop 10 for the operating system Windows 95® is illustrated in FIG. 1.

The World Wide Web (hereinafter the "Web") has become a popular medium for the exchange of information and for electronic commerce via the Internet. The Web is comprised of servers (computers connected to the Internet) having hypertext documents or Web pages stored therewithin. Web pages are accessible by client devices using browser programs (hereinafter "Web browsers") utilizing the Hypertext Transfer Protocol (HTTP) and the Transmission Control Protocol/Internet Protocol (TCP/IP). Exemplary Web browsers include Netscape Navigator® (Netscape Communications Corporation, Mountain View, Calif.) and Microsoft Internet Explorer® (Microsoft Corporation, Redmond, Wash.). Web browsers typically present to a user a graphical user interface for retrieving and viewing Web pages hosted by HTTP servers. An exemplary Web browser associated with a window on a graphical user interface desktop is illustrated in FIG. 2. Within the displayed Web browser window is a Web page from an HTTP server.

Many application programs, particularly Web browsers, have increased functionality when coupled or paired with a co-running, enhancing application program. For example, Netscape Navigator® and Microsoft Internet Explorer® can be enhanced using application programs referred to as "plug-ins." A plug-in is an application program built specifically to work within a particular Web browser's architecture. Other enhancing application programs, such as Weblicator, WebEx, Web Whacker, and ARTour Web Express, perform various functions with a variety of browsers but are not plug-ins.

When an application program is used to enhance another application program, it is desirable to visually link the application program with the enhancing application. Unfortunately, some enhancing application programs utilize separate runtime windows which are not directly connected or associated with the application program being enhanced. For example, Web browser enhancing applications such as WebEx, Weblicator, and ARTour Web Express have integrated their controls directly into a Web page displayed by a browser using "surf" or "navigation" bars. Although embedding controls into a Web page integrates the enhancing application program's controls with the browser program, several problems often result. For example, dynamically updating a navigation bar embedded within a static Web page is somewhat difficult. Furthermore, if the Web page has multiple frames within it, then multiple embedded navigation bars get embedded-one for each frame. Embedded navigation bars can be somewhat incompatible with Web pages containing non-standard HyperText Markup Language (HTML) and with some Java applets. Embedded navigation bars often destroy the visual integrity or aesthetics of a Web page in which they are embedded. In addition, a unique set of controls typically must be designed for each Web browser because all Web browsers are not currently adhering exactly to the same protocols and conventions.

"Note Its" (manufactured by International Business Machines) is an OS/2 enhancing application program which allows users to attach "sticky notes" to an application program displayed within a window to display information associated with the sticky note with the application. Unfortunately, each sticky note must be positioned by the user. Furthermore, repositioning and resizing the application program window in which the sticky note is attached typically requires the user to have to reposition the sticky note because it gets linked to a point on the primary application window, not to an edge. With multiple windows on a desktop, a user may be required to resize or reposition windows often. Consequently, a user may be required to reposition sticky notes within each window often.

SUMMARY OF THE INVENTION

In light of the above discussion, it is an object of the present invention to provide a way of displaying a primary application program and an enhancing application program within a desktop of a graphical user interface.

It is a further object of the present invention to provide controls and status indications for an enhancing application program that are aesthetically pleasing to a user and that do not degrade the visual integrity of the enhanced application program within a graphical user interface.

It is another object of the present invention to provide controls and status indication for an enhancing application program that are dynamically updated independent from the enhanced application program.

It is yet another object of the present invention to provide controls and status indication for a secondary application program that can be used to enhance various primary application programs.

These and other objects of the present invention are provided by methods, data processing systems and computer program products which provide a user interface wherein a "foster" or second window associated with a secondary application program can be removably attached or "docked" to a primary window associated with a primary application program. An exemplary first application program is a Web browser program. The second window, may be removably attached to the first window along respective edge portions of each window. An exemplary secondary application program is an application program which enhances the functionality of the primary application program. The second window may display information associated with the secondary application program. For example, the second window may contain dynamically updated indicia for indicating operational status of the primary and/or secondary application programs. In addition, the second window may contain controls allowing a user to enhance the primary application program via the secondary application program.

The second window can be automatically repositioned responsive to user input for repositioning the first window, such that the first and second windows maintain a generally rectangular attached configuration. In addition, the docked second window can be automatically resized responsive to user input for resizing the first window, such that the first and second windows maintain a generally rectangular attached configuration. The second window may be resized in one dimension or in two dimensions. Furthermore, a user may detach the docked second window of the secondary application program from the first window of the primary application program and display the second window elsewhere within a graphical user interface desktop.

The second window may be automatically removed from the desktop workspace in response to user input for removing the first window from the desktop workspace. The second window may be automatically removed from the desktop workspace in response to user input for ending data processing functions of the first application program. Furthermore, the second window may be automatically converted to an access bar displayed within the user interface in response to user input for resizing the first window to a maximum size.

When a second window is attached to a first window, the first window may be prohibited from being reduced below a predefined size. This predefined size is typically the smallest size that the second window can have and remain functional to the user. Resizing, repositioning and removing the second window may be accomplished by intercepting user messages to the first window or by intercepting operating system messages to the first window, and then respectively resizing, repositioning, or removing the second window in response to these intercepted messages.

The present invention is advantageous because a primary application program can be enhanced by a secondary application program without the limitations associated with embedding the secondary application program controls within the primary application program window. In the case of Web browsers, the present invention facilitates dynamically updating of primary and/or secondary application program controls and information. Limitations associated with non-standard HTML coding and Java applets can be avoided since the embedding of controls within the primary application program window is not necessary. Furthermore, by not embedding the controls of a secondary application program within a primary application program window, multiple instances of the primary application program window do not result in multiple instances of the secondary application program controls. Furthermore, another advantage of keeping the enhancing application window out of the application space of the primary application is that the developers of the enhancing application may not have to coordinate anything with the developers of the primary application. Otherwise, this could be costly in terms of time and resources and could also tend to reduce the enhancement support of primary applications having a smaller market presence.

From a user's standpoint, the present invention is advantageous because of the close visual and spatial relationship of the secondary enhancing application program with the primary application program that is enhanced. Furthermore, the visual integrity of the primary application program displayed in the first window is maintained because the attached second window does not take up valuable space with the first window. In addition, the present invention is "application independent" because the second window can be attached to various primary application program windows. Consequently, limitations associated with the enhancement of application programs using different protocols and conventions, such as the various Web browsers, may be overcome.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
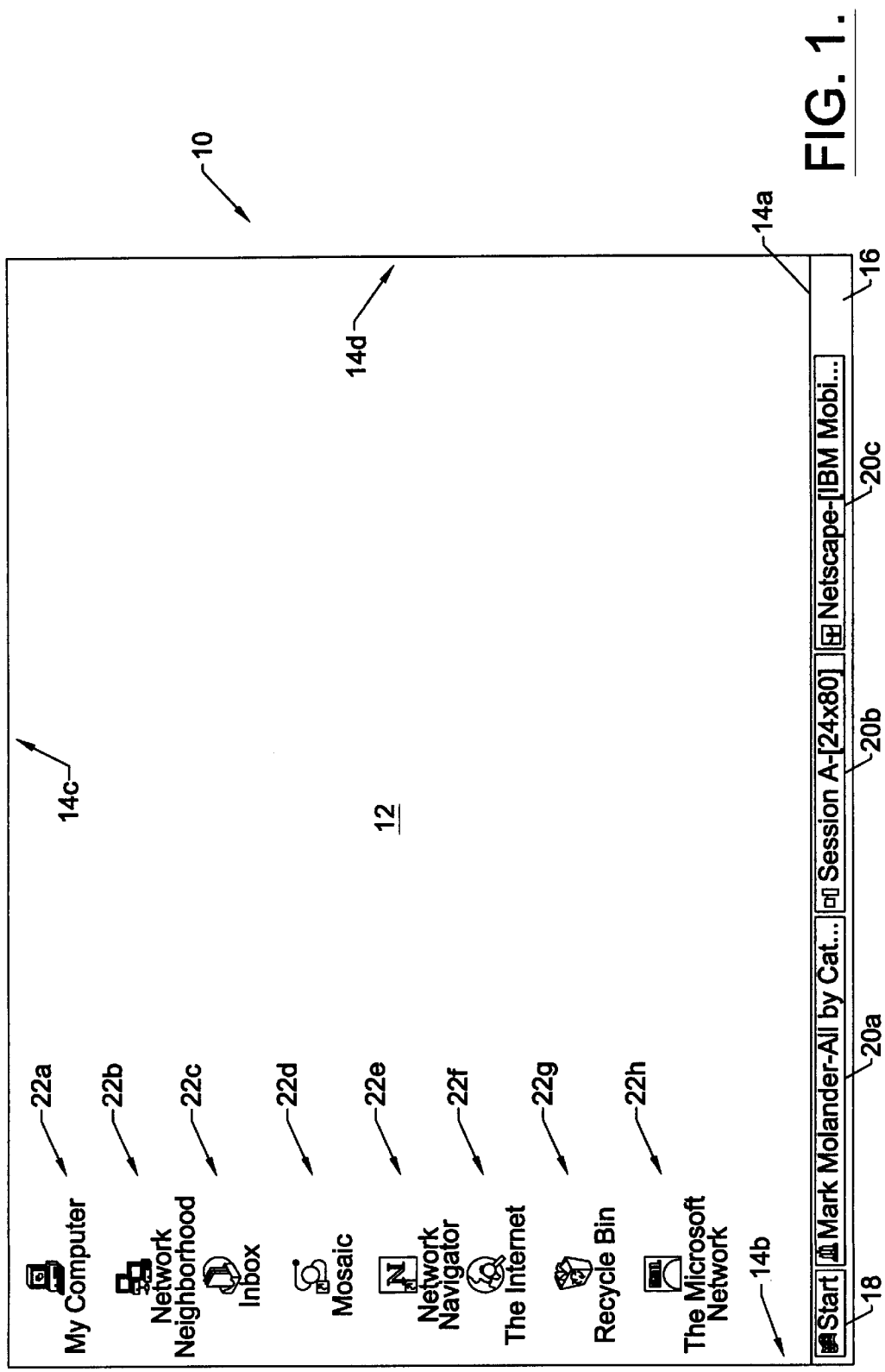
FIG. 1 is a user interface for the operating system Windows 95® illustrating a desktop with a workspace.

Referring now to FIG. 1, an exemplary desktop 10 for the user interface of the operating system Windows 95® is illustrated. The illustrated desktop 10 includes a workspace 12 within which windows associated with application programs may be displayed. Along a lower edge portion 14a of the desktop 10 in the illustrated embodiment is an access bar 16 for the Windows 95® desktop, also referred to as the "task bar." The task bar 16 contains a "Start" button 18 which may be used to open an application program within a window displayed within the workspace 12. The Start button 18 may also be used to perform other operating system tasks. When an application program is associated with a window displayed within the workspace 12, a button typically appears on the task bar 16 for the purpose of indicating that the application program is open. In the illustrated task bar 16, a plurality of buttons 20a, 20b, 20c indicate open application programs. However, for illustrative purposes, these open applications are not displayed within respective windows in the desktop 10 of FIG. 1. Using buttons on the task bar 16, a user can switch between application programs running within respective windows on the desktop 10. The task bar 16 can be hidden from view or can remain visible to a user. Windows 95® typically allows a maximum of two access bars to be positioned along each of the four edge portions 14a, 14b, 14c, 14d, for a total of eight. A plurality of icons 22a–22h are positioned along a left edge portion 14b of the desktop 10. When activated, each of these icons 22a–22h will launch a respective application or perform a specified task or series of tasks, as would be known to those skilled in the art.

Figure 2:
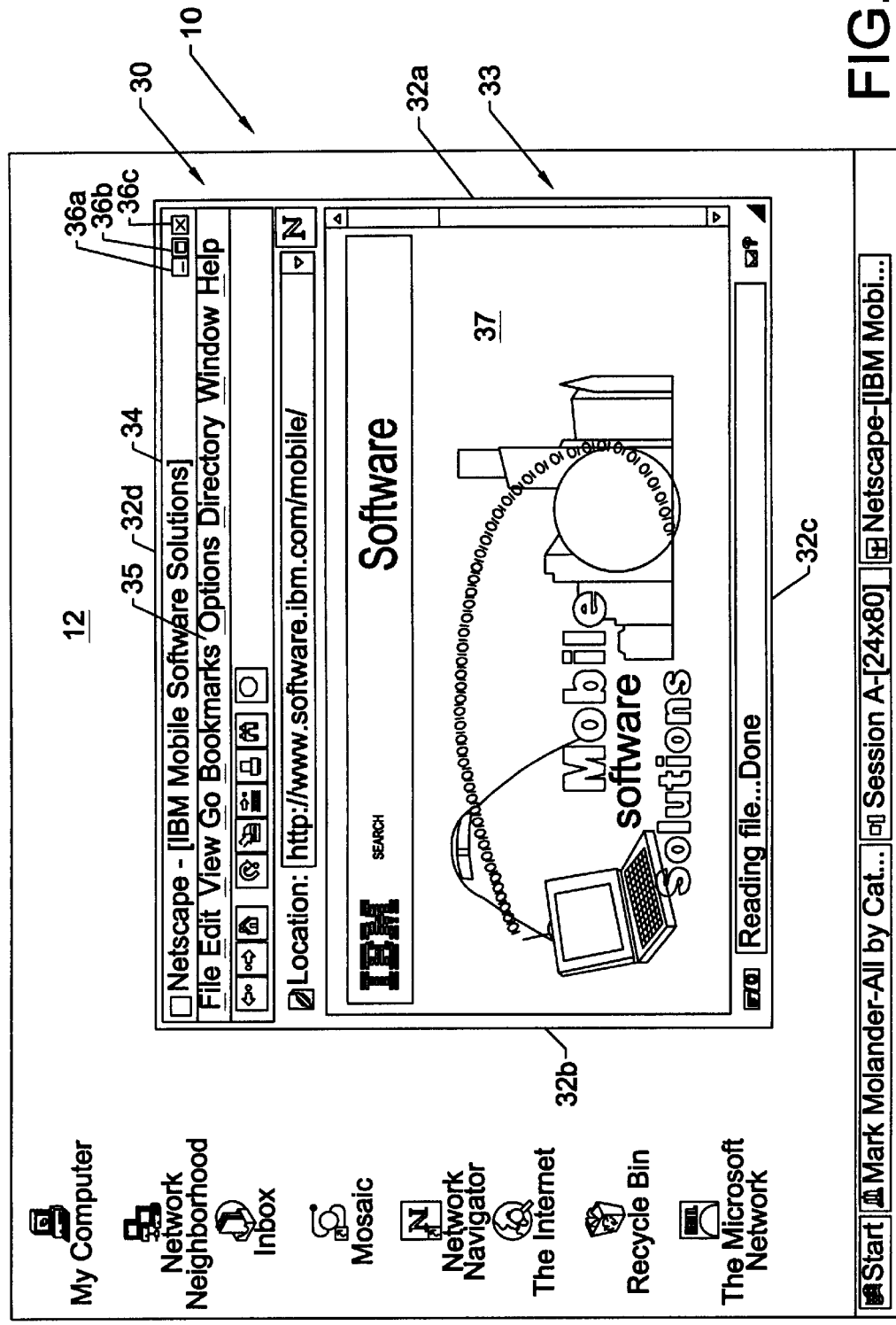
FIG. 2 is the user interface of FIG. 1 having a window associated with a Web browser program displayed within the desktop workspace.

Referring now to FIG. 2, an exemplary window (hereinafter referred to as the "primary application window") 30 associated with a primary application program is displayed within the desktop 10. The illustrated primary application window 30 is defined by opposing parallel edge portions 32a, 32b and opposing parallel edge portions 32c, 32d which form a generally rectangular border 33 surrounding the primary application window 30, and within which the primary application program is displayed. The illustrated primary application window 30 includes a title bar 34. A menu 35 containing a series of user-selectable choices are available for managing the appearance and contents of the primary application window 30.

In combination with a pointing device, the window illustrated in FIG. 2 may be independently moved and resized by "dragging" the border 33 to a new location. Resizing the primary application window 30 may also be accomplished by dragging a corner of the window which simultaneously resizes the window in two directions. The primary application window 30 illustrated in FIG. 2 includes buttons 36a and 36b for automatically minimizing and maximizing the size of the window, respectively. A button 36c is also provided for closing the primary application program and for removing the window from the desktop 10. In the illustrated embodiment, a Web browser is the primary application program associated with the displayed primary application window 30, and a web page 37 is displayed thereby.

Figure 3:
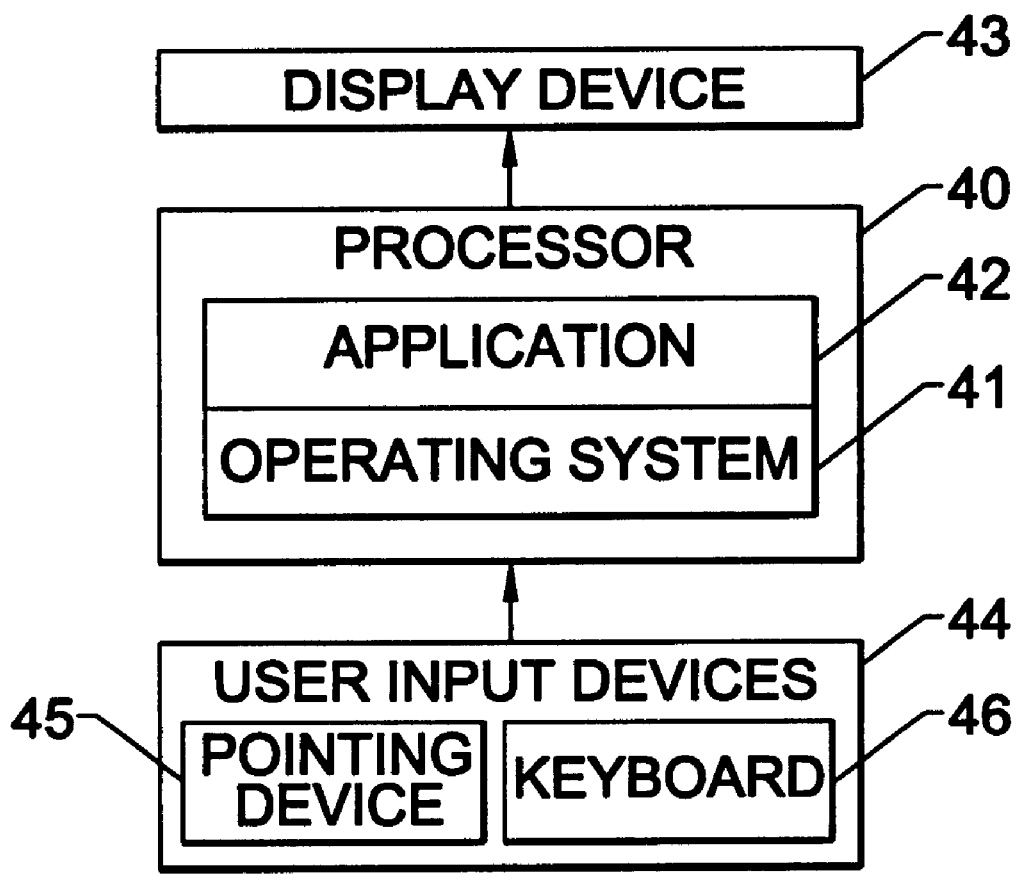
FIG. 3 is a logical diagram of a system utilizing the present invention.

FIG. 3 illustrates a data processing system in which the present invention may be utilized. As seen in FIG. 3, a data processor 40 may have an operating system 41 resident in the processor 40. An application program 42 may be running on the operating system 41. The processor 40 displays information on a display device 43. The display device 43 has a plurality of picture elements (collectively referred to as a screen) which may define the appearance of a user interface environment displayed on the display device 43. The contents of the screen of the display device 43 and, therefore, the appearance of the user interface environment, may be controlled or altered by the application program 42 or the operating system 41 either individually or in combination. For obtaining input from a user, the operating system 41, the application program 42, or both, may utilize user input devices 44. User input devices 44 may include a pointing device 45 and a keyboard 46 or other input devices known to those of skill in the art. User input devices 44 may be used to designate areas of the screen or locations on the screen such as the border of a workspace or the corner of the borders of the workspace.

Figure 4A:
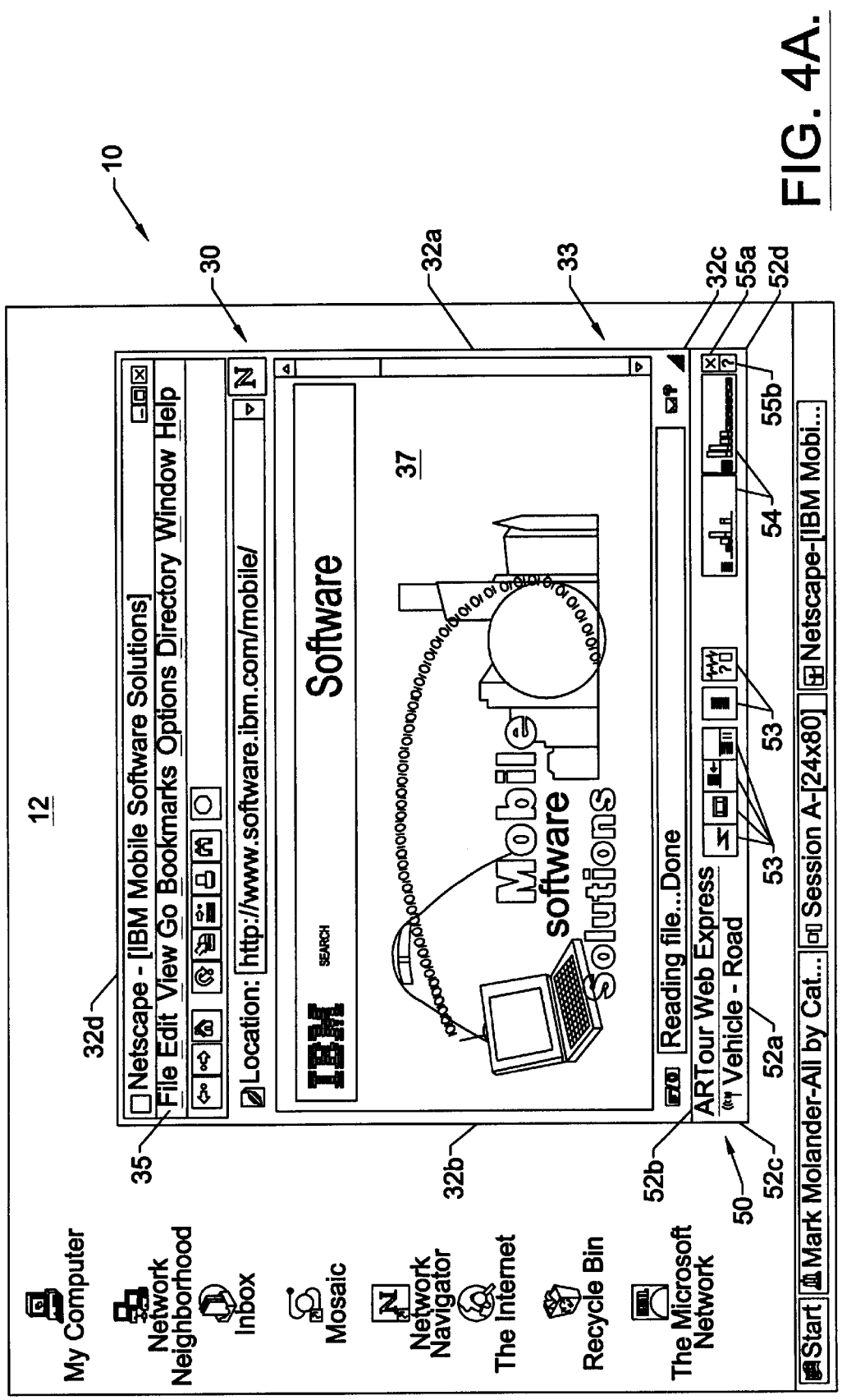
FIG. 4A illustrates a second window removably attached to the window illustrated in FIG. 2, in accordance with an aspect of the present invention.

Referring now to FIG. 4A, a second or "foster" window 50, associated with an enhancing or secondary application program, is shown "docked" or attached to the primary application window 30. As used herein, the terms "(docked" or "docking" and "attached" or "attaching", respectively, shall be used interchangeably. It is to be understood that the term "foster window" does not mean a "child window" of a primary application window. A foster window may be the primary or main window of a secondary or enhancing application program. In the illustrated embodiment, the foster window 50 has a generally rectangular configuration defined by opposing parallel edge portions 52a and 52b, and by opposing parallel edge portions 52c and 52d. The foster window 50 and the primary application window 30 are attached along edge portions 52b and 32c, respectively. However, it is to be understood that the foster window 50 could be attached to the primary application window 30 along each of the edge portions 32a, 32b, 32c, 32d of the primary application window.

Preferably, the foster window 50 includes controls and indicia for allowing a user to utilize the associated secondary application program to enhance the primary application program displayed within the primary application window 30. In the illustrated embodiment, a series of buttons or icons 53 are displayed within the foster window 50. These icons 53 may represent any number of user-selectable options for controlling the secondary application program and for enhancing the primary application program. As will be appreciated by those of skill in the art, while the present invention is described with respect to icons, any number of user selectable options in various formats including radio buttons, pull-down menus, and the like, may be employed.

In the illustrated embodiment, indicia 54 is provided for indicating status of the secondary application program and the primary application program (Web browser) being enhanced. Preferably, the indicia 54 can be updated dynamically, independent of the application program associated with the primary application window 30. Various formats of indicia may be utilized for displaying information relating to the secondary and/or primary application programs.

Preferably, the foster window 50 is removably attached to the primary application window 30. This means that the foster window 50 can be detached from the primary application window 30 and placed elsewhere within the desktop workspace 12. The secondary application program associated with the foster window 50 may be controlled by a user via the foster window regardless of whether or not the secondary and primary application windows 50,30 are attached.

The foster window 50 is automatically repositioned in response to repositioning of the primary application window 30 such that a generally rectangular attached configuration is maintained. Similarly, the foster window 50 is automatically resized in response to resizing of the primary application window such that a generally rectangular attached configuration is maintained. When the primary application window 30 is resized, the foster window 50 is preferably resized along only one dimension. However, the foster window 50 may be resized in more than one dimension, if so desired. When reducing the size of a foster window, a user may have the option of removing various elements from the foster window 50. The removal of elements may be performed based on a prioritization of the elements contained within the foster window 50. Elements within the foster window 50 may also be "squished" by decreasing the width and height thereof, thereby allowing the foster window to be reduced in size.

When the foster window 50 is attached to the primary application window 30, as illustrated in FIG. 4A, it is preferable that the primary application window 30 be prevented from reducing below a predefined size. This predefined size will typically be the smallest size that the second window can have and remain functional in the display of information to the user. For example, the extent to which the primary application window 30 is reduced by moving opposing edge portions 32a and 32b towards each other may be limited to the smallest dimension between the foster window opposing edge portions 52c and 52d within which the icons 53 and indicia 54 can be displayed within the foster window. Should it be desirable to minimize the size of the primary application window further, it could be desirable to detach the foster window 50 from the primary application window, make the foster window scrollable, or else enlarge the foster window in the dimension opposite of the resizing.

Preferably, the foster window 50 is automatically removed from the desktop workspace 12 when the primary application window 30 is removed from the desktop workspace. In addition, it is preferable to automatically remove the foster window from the desktop workspace 12 when the application program associated with the primary application window 30 is terminated. Furthermore, the foster window may be automatically converted to an access bar displayed within the user interface desktop in response to resizing of the primary application window to a maximum size within the workspace 12. As would be understood by those skilled in the art, resizing, repositioning and removing the foster window may be accomplished by intercepting user messages to the primary application window 30 or by intercepting operating system messages to the primary application window and then respectively resizing, repositioning, or removing the foster window in response to these intercepted messages before passing them on to the primary application window (with possible modifications).

Figure 4B:
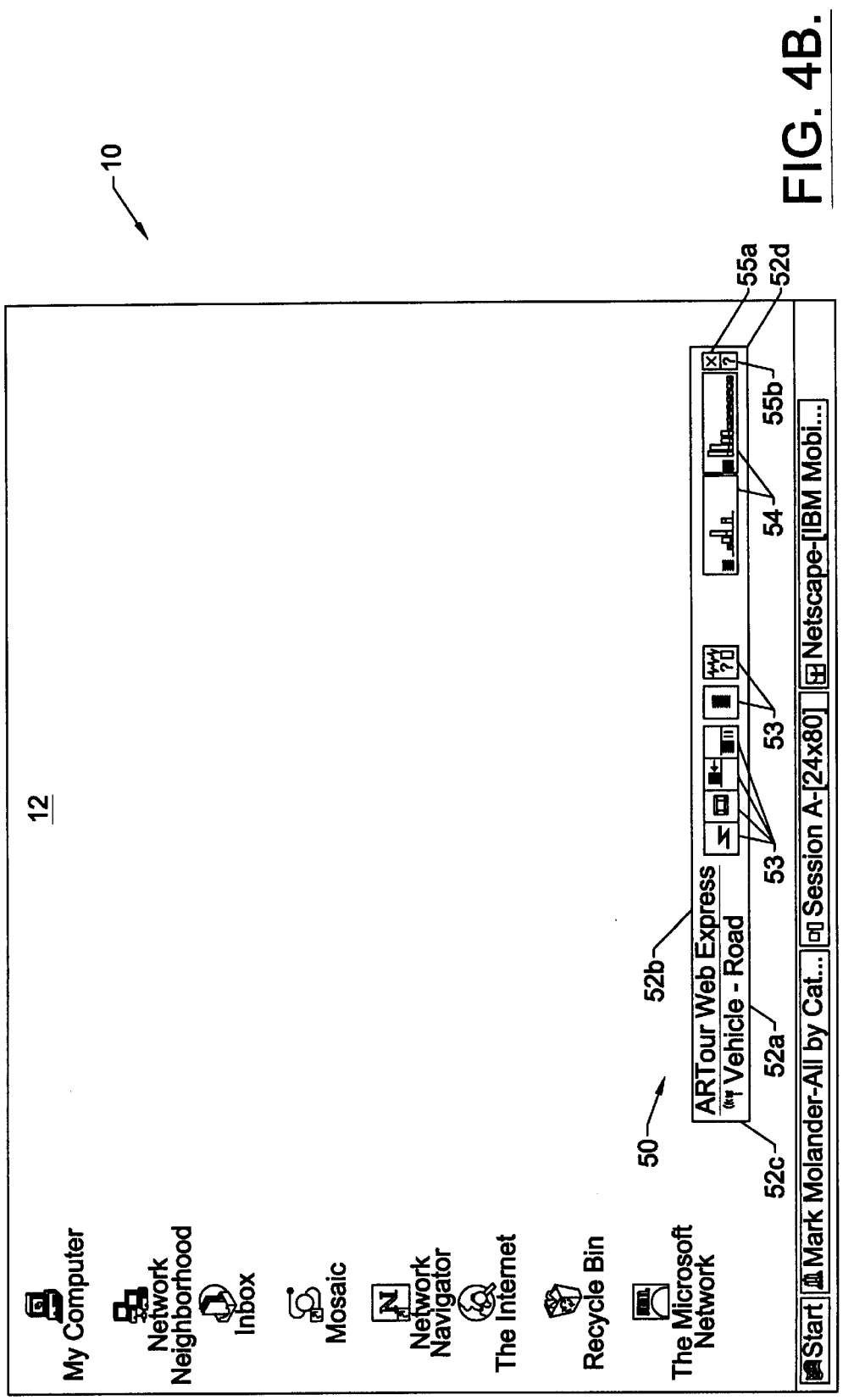
FIG. 4B illustrates the second window illustrated in FIG. 2 within a user interface desktop, in accordance with an aspect of the present invention.

For example, in the illustrated embodiment of FIG. 4A, if a user were to minimize the primary application window 30, whether or not the Web browser was terminated, the foster window 50 would be removed from the workspace 12 in response. Similarly, if a user were to terminate the Web browser, the primary application window 30 would typically be removed from the workspace 12. In response to the termination of the Web browser, the foster window 50 would be removed from the workspace 12, also. Alternatively, as illustrated in FIG. 4B, minimization of a primary application window or termination of a primary application program could result in the foster window 50 remaining on the desktop workspace 12. The foster window 50 would then be available for attachment to another primary application program. The foster window 50 can be attached to the window associated with various primary application programs, and is not limited to a specific primary application program or program type. Preferably, the docking and undocking of a foster window from a primary application window is a user selectable option or is automated based on a profile. According to another aspect of the present invention, a foster window associated with an enhancing application program may be started and displayed without starting the primary application program to be enhanced.

Still referring to FIG. 4B, the foster window 50 can be removably attached to a window associated with a primary application program in a number of ways. For example, attachment may occur by dragging the foster window 50 within close proximity of an edge portion of a primary application window. Attachment may also occur by dragging a primary application window within close proximity of an edge portion of the foster window 50. Attachment may also occur automatically based on the secondary application programs sensing the starting of the primary application program. Attachment may also occur based on a setting made in the secondary application program, such as a menu choice to "dock to all Web browsers", or "dock to preferred Web browser."

According to another aspect of the present invention, a foster window may be attached to each primary application window on a user's desktop. For example, a user may have three Web browsers in three respective primary application windows on the desktop at the same time. A foster window associated with an enhancing application program may be docked to each of these primary application windows. Preferably, the docking and undocking of multiple foster windows with multiple primary application windows is a user selectable option.

Figure 5:
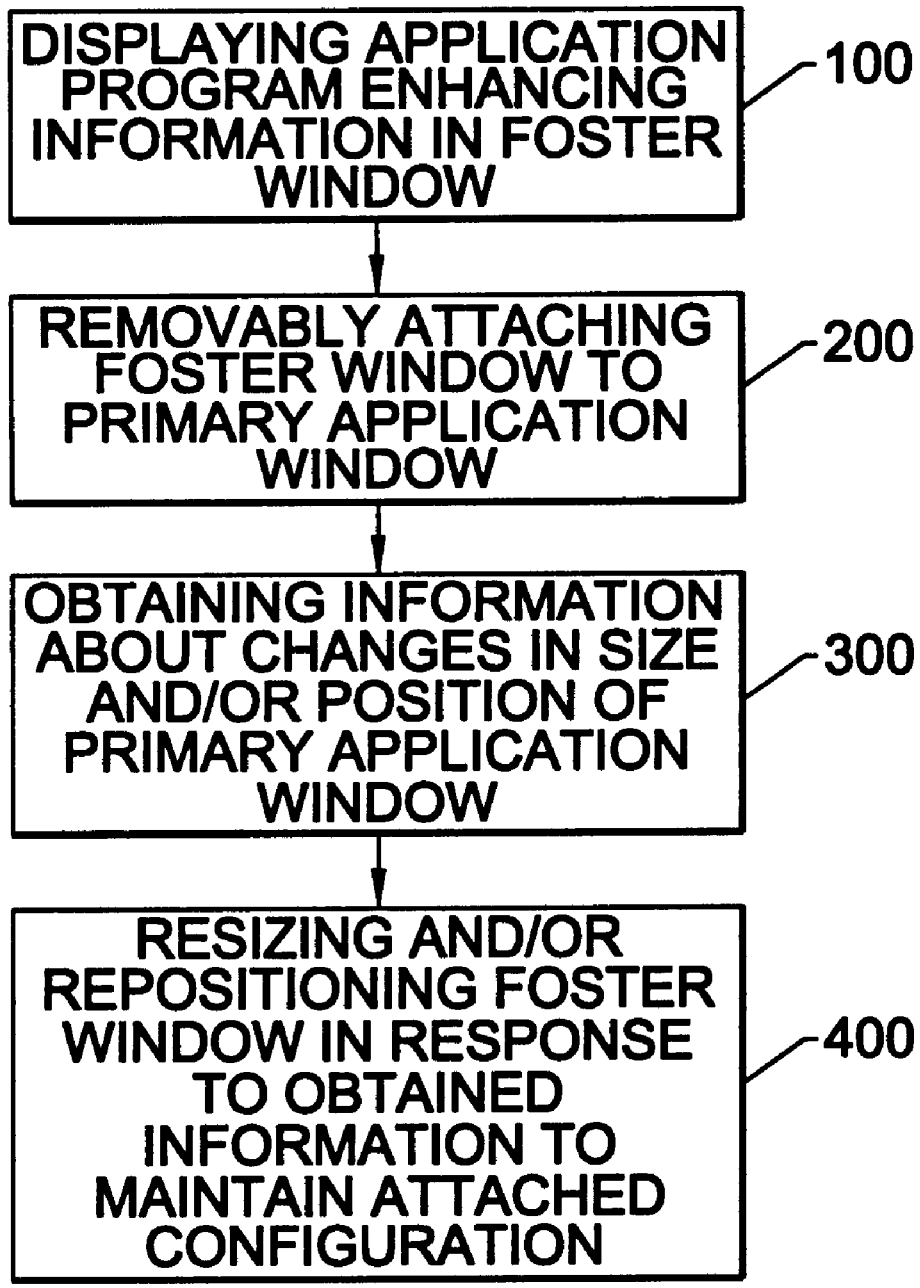
FIGS. 5–6 are flowcharts schematically illustrating operations for various aspects of the present invention.

Referring now to FIG. 5, operations for enhancing a primary application program associated with a window displayed within a desktop workspace of a data processing system user interface are illustrated. Operations include: displaying application program enhancing information in a foster window (Block 100); removably attaching the foster window to a primary application window (Block 200); obtaining information about changes in size and/or position of the primary application window (Block 300); and resizing and/or repositioning the foster window in response to obtained information about the primary application window to maintain the primary and foster windows in an attached configuration (Block 400).

As described above, operations for displaying application program enhancing information (Block 100) may include displaying information about a primary application program and/or a secondary application program associated with a foster window for enhancing the primary application. Displayed information may preferably be dynamically updated independently from the primary application program. Displayed information may include operational status of the primary and/or secondary application programs. Displayed information may also include user selectable options, such as buttons or icons to control the primary and/or secondary application programs.

Operations for removably attaching a foster window to a primary application window (Block 200) include attaching a foster window to a primary application window along respective edge portions thereof such that a generally rectangular attached configuration is achieved. As described in detail above, the foster window can be automatically repositioned and/or resized in response to the repositioning and/or resizing of the primary application window, so as to maintain a generally rectangular attached configuration.

Operations for obtaining information about changes in size and/or position of a primary application window (Block 300) may include intercepting user messages to a primary application window or by intercepting operating system messages to a primary application window. As would be understood by those skilled in the art, other methods of obtaining information about a primary application window may be utilized. Operations for resizing and/or repositioning a foster window in response to obtained information about a primary application window (Block 400) may include resizing, repositioning and removing the foster window as described above.

Figure 6:
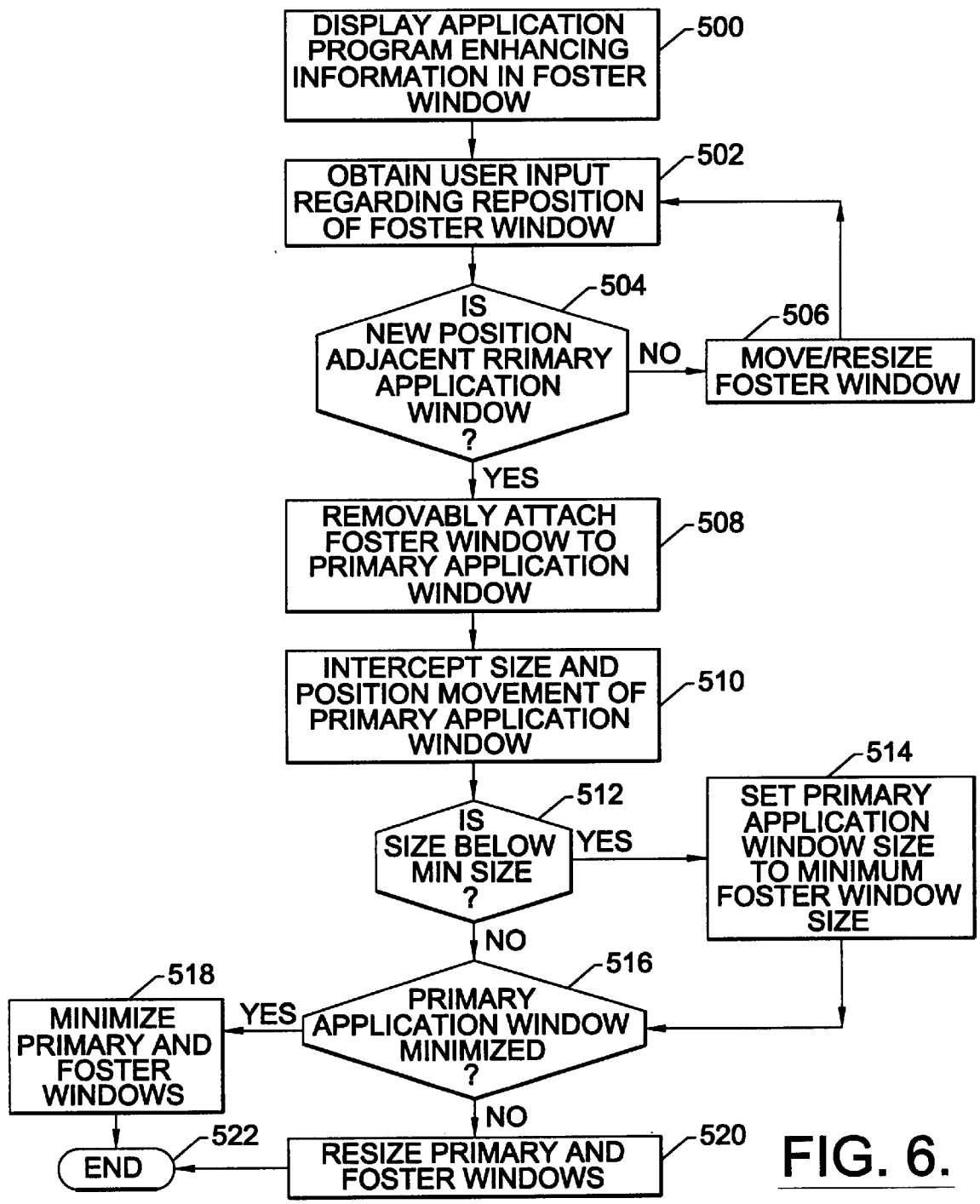

Referring now to FIG. 6, operations for enhancing a primary application program associated with a window displayed within a desktop workspace of a data processing system user interface according to other aspects of the present invention are illustrated. Application program enhancing information is displayed in a foster window (Block 500) which is preferably displayed on a graphical user interface desktop. When user input is obtained regarding the repositioning of a foster window (Block 502), a determination is made whether the new position for the foster window is adjacent a primary application window (Block 504). If the new position of the foster window is not adjacent a primary application window, the foster window is repositioned and/or resized according to user input (Block 506). If the new position of the foster window is adjacent a primary application window, the foster window is removably attached to the adjacent primary application window (Block 508).

Once attached to a primary application window, size and position movement information for the primary application window is intercepted (Block 510). When such information is intercepted, a determination is made whether the intercepted information is requesting the primary application window to be sized below a minimum size (Block 512) dictated by the size of the attached foster window. If the requested size is below the minimum size, the primary application window size is set to the minimum size dictated by the foster window (Block 514). If the requested size is not below the minimum size, a determination is made whether the primary application window was minimized (Block 516). If the primary application window was minimized, both the primary and foster windows are minimized (Block 518) and operations end (Block 522). If the primary application window was not minimized, both the primary and foster windows are resized accordingly (Block 520) and operations end (Block 522).

It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A user interface for a data processing system, the user interface comprising:

a desktop having a workspace;

means for movably displaying a first window within said workspace, said first window having a first stand alone application program associated therewith;

means responsive to user input for removably attaching a second window along an edge portion of said first window such that said first and second windows have a combined rectangular attached configuration, said second window having a second stand alone application program, different from the first stand alone application program, associated therewith; and means for automatically repositioning and resizing respectively said second window responsive to user input for repositioning and resizing respectively said first window, such that said first and second windows maintain a combined rectangular attached configuration;

wherein each application program may be started and displayed without the other, and wherein the attaching of the first and second windows causes the second application program to enhance the first application program.

2. A user interface according to claim 1 wherein said second window includes dynamically updated indicia for indicating operational status of at least one of said first or second application programs.

3. A user interface according to claim 1 wherein said second window includes control means for enhancing said first application program via said second application program.

4. A user interface according to claim 1 further comprising means for detaching said second window from said first window and displaying said second window within said workspace.

5. A user interface according to claim 1 further comprising means for automatically removing said second window from said workspace in response to user input for removing said first window from said workspace.

6. A user interface according to claim 1 further comprising means for automatically removing said second window from said workspace in response to user input for ending data processing functions of said first application program.

7. A user interface according to claim 1 further comprising means for automatically converting said second window to an access bar displayed within said desktop in response to user input for resizing said first window to a maximum size within said workspace.

8. A method of enhancing a first stand alone application program associated with a first window displayed within a desktop workspace of a data processing system user interface, said method comprising the steps of:

displaying information in a second window;

removably attaching said second window along an edge portion of said first window such that said first and second windows have a combined rectangular attached configuration, and wherein said second window is associated with a second stand alone application program, different fron the first stand stand alone application program; and automatically repositioning and resizing said second window responsive to user input for repositioning and resizing respectively said first window, such that said first and second windows maintain a combined rectangular attached configuration;

wherein each application program may be started and displayed without the other, and wherein the attaching of the first and second windows causes the second application program to enhance the first application program.

9. A method according to claim 8 further comprising displaying within said second window dynamically updated indicia for indicating operational status of at least one of said first or second application programs.

10. A method according to claim 8 further comprising displaying within said second window control means for enhancing said first application program via said second application program.

11. A method according to claim 7 wherein said second window is resized along only one dimension.

12. A method according to claim 8 further comprising limiting resizing of said first window within said workspace based on a predefined minimum size of said second window.

13. A method according to claim 8 further comprising automatically resizing said second window responsive to user input for resizing said first window, such that said first and second windows maintain a combined rectangular attached configuration.

14. A method according to claim 8 further comprising the step of automatically removing said second window from said workspace in response to user input for removing said first window from said workspace.

15. A method according to claim 8 further comprising the step of automatically removing said second window from said workspace in response to user input for ending data processing functions of said first application program.

16. A user interface for a data processing system, the user interface comprising:

a desktop having a workspace;

means for movably displaying a first window within said workspace, said first window having a first stand alone application program associated therewith;

means for displaying information associated with a second stand alone application program in a second window, wherein the second application program is related to the first application program;

means for removably attaching said second window along an edge portion of said first window such that said first and second windows have a combined rectangular attached configuration, and wherein said second window is associated with the second application programs;

means for intercepting user input to resize and reposition said first window; and means for resizing and repositioning respectively said second window responsive to intercepted user input to resize and reposition said first window, such that said first and second windows maintain a combined rectangular attached configuration;

wherein each application program may be started and displayed without the other, and wherein the attaching of the first and second windows causes the second application program to enhance the first application program.

17. A user interface according to claim 16 further comprising means for displaying within said second window dynamically updated indicia for indicating operational status of at least one of said first or second application programs.

18. A user interface according to claim 16 further comprising means for displaying within said second window control means for enhancing said first application program via said second application program.

19. A user interface according to claim 16 further comprising means for limiting resizing of said first window within said workspace based on a predefined minimum size of said second window.

20. A computer program product for enhancing a first stand alone application program associated with a first window displayed within a desktop workspace of a data processing system user interface, said computer program product comprising a computer usable medium having computer readable program code means embodied in said medium, said computer readable program code means comprising:

computer readable program code means for displaying information associated with a second stand alone application program in a second window, wherein the second application program is related to the first application program;

computer readable program code means for removably attaching said second window along an edge portion of said first window such that said first and second windows have a combined rectangular attached configuration, and wherein said second window is associated with the second application programs;

computer readable program code means for automatically repositioning said second window responsive to user input for repositioning said first window, such that said first and second windows maintain a generally rectangular attached configuration; and computer readable program code means for automatically resizing said second window responsive to user input for resizing said first window, such that said first and second windows maintain a combined rectangular attached configuration;

wherein each application program may be started and displayed without the other, and wherein the attaching of the first and second windows causes the second application program to enhance the first application program.

21. A computer program product according to claim 20, further comprising computer readable program code means embodied in said medium for displaying within said second window control means for enhancing said first application program via said second application program.

22. A computer program product according to claim 20 further comprising:

computer readable program code means embodied in said medium for intercepting user input to said first window; and computer readable program code means embodied in said medium for resizing said second window responsive to intercepted user input to said first window.

23. A computer program product according to claim 22, further comprising computer readable program code means embodied in said medium for resizing said second window along only one dimension.

24. A computer program product according to claim 20, further comprising computer readable program code means embodied in said medium for limiting resizing of said first window within said workspace based on a predefined minimum size of said second window.

25. A computer program product according to claim 20, further comprising computer readable program code means for displaying within said second window dynamically updated indicia for indicating operational status of at least one of said first or second application programs.

26. A computer program product according to claim 20, further comprising computer readable program code means for displaying within said second window control means for enhancing said first application program via said second application program.

27. A computer program product according to claim 20, further comprising computer readable program code means for detaching said second window from said first window and displaying said second window within said workspace.

28. A computer program product according to claim 20, further comprising computer readable program code means for automatically removing said second window from said workspace in response to user input for removing said first window from said workspace.

29. A computer program product according to claim 20, further comprising computer readable program code means for automatically removing said second window from said workspace in response to user input for ending data processing functions of said first application program.

* * * * *

UNITED STATES PATENT AND TRADEMARK OFFICE
CERTIFICATE OF CORRECTION

PATENT NO. : 5,923,326
DATED : July 13, 1999
INVENTOR(S) : Bittinger et al.

It is certified that error appears in the above-identified patent and that said Letters Patent is hereby corrected as shown below:

Column 10, line 27, delete "respectively".

Column 11, line 6, delete "fron" and insert - - from - - therefor.

Column 11, line 26 delete "7" and insert - - 8 - - therefor.

Column 12, line 36, delete "programs" and insert - - program - - therefor.

Signed and Sealed this

Sixth Day of June, 2000

*Attest:*

Q. TODD DICKINSON

*Attesting Officer*   Director of Patents and Trademarks